United States Patent
Komiya et al.

(10) Patent No.: US 10,371,587 B2
(45) Date of Patent: Aug. 6, 2019

(54) GAS FILLING SYSTEM AND VEHICLE

(71) Applicant: TOYOTA JIDOSHA KABUSHIKI KAISHA, Toyota-shi (JP)

(72) Inventors: Kenji Komiya, Toyota (JP); Kousei Yoshida, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 629 days.

(21) Appl. No.: 14/389,883

(22) PCT Filed: Apr. 26, 2013

(86) PCT No.: PCT/JP2013/002844
§ 371 (c)(1),
(2) Date: Sep. 2, 2015

(87) PCT Pub. No.: WO2013/161318
PCT Pub. Date: Oct. 31, 2013

(65) Prior Publication Data
US 2015/0362383 A1 Dec. 17, 2015

(30) Foreign Application Priority Data
Apr. 26, 2012 (JP) ................................. 2012-101322

(51) Int. Cl.
*G01K 15/00* (2006.01)
*B60K 15/03* (2006.01)
(Continued)

(52) U.S. Cl.
CPC ...... *G01K 15/005* (2013.01); *B60K 15/03006* (2013.01); *F17C 5/007* (2013.01);
(Continued)

(58) Field of Classification Search
CPC . G01K 15/005; B60K 15/03006; F17C 5/007; F17C 5/06; F17C 13/025; F17C 13/026; H01M 8/04208; H01M 8/04373
(Continued)

(56) References Cited

U.S. PATENT DOCUMENTS 6,131,548 A * 10/2000 Yano .................... F02D 41/22
123/381
2004/0144178 A1 * 7/2004 Ohmi ..................... G01D 3/022
73/708
(Continued)

FOREIGN PATENT DOCUMENTS

JP 2005-053358 A 3/2005
JP 2007-016893 A 1/2007
(Continued)

*Primary Examiner* — Janet L Suglo
*Assistant Examiner* — Douglas Kay
(74) *Attorney, Agent, or Firm* — Hunton Andrews Kurth LLP

(57) ABSTRACT

The gas filling system includes: a vehicle that includes a tank and a first communication instrument; and a gas station that includes a second communication instrument. The vehicle includes: a first temperature sensor that acquires temperature information of the gas stored in the tank; a second temperature sensor that acquires temperature information outside the tank; and a controller. The controller permits transmission of the temperature information of the first temperature sensor to the second communication instrument on the condition that the absolute value of a difference between an indicated value of the first temperature sensor and an indicated value of the second temperature sensor is smaller than or equal to a predetermined value, and prohibits transmission of the temperature information of the first temperature sensor to the second communication instrument on the condition that the absolute value of the difference is larger than the predetermined value.

11 Claims, 11 Drawing Sheets

(51) Int. Cl.
*F17C 5/00* (2006.01)
*F17C 5/06* (2006.01)
*F17C 13/02* (2006.01)
*H01M 8/04082* (2016.01)
*H01M 8/0432* (2016.01)

(52) U.S. Cl.
CPC .............. *F17C 5/06* (2013.01); *F17C 13/025* (2013.01); *F17C 13/026* (2013.01); *H01M 8/04208* (2013.01); *H01M 8/04373* (2013.01); *B60K 2015/03013* (2013.01); *B60K 2015/03019* (2013.01); *B60K 2015/03315* (2013.01); *F17C 2201/0104* (2013.01); *F17C 2201/056* (2013.01); *F17C 2203/0604* (2013.01); *F17C 2203/0619* (2013.01); *F17C 2203/0639* (2013.01); *F17C 2203/0663* (2013.01); *F17C 2205/0142* (2013.01); *F17C 2205/0305* (2013.01); *F17C 2205/0326* (2013.01); *F17C 2205/0335* (2013.01); *F17C 2205/0385* (2013.01); *F17C 2205/0391* (2013.01); *F17C 2205/0394* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/0161* (2013.01); *F17C 2223/033* (2013.01); *F17C 2223/035* (2013.01); *F17C 2223/036* (2013.01); *F17C 2225/0123* (2013.01); *F17C 2225/036* (2013.01); *F17C 2250/032* (2013.01); *F17C 2250/034* (2013.01); *F17C 2250/043* (2013.01); *F17C 2250/0439* (2013.01); *F17C 2250/0491* (2013.01); *F17C 2250/0621* (2013.01); *F17C 2250/0636* (2013.01); *F17C 2250/0694* (2013.01); *F17C 2260/023* (2013.01); *F17C 2265/065* (2013.01); *F17C 2270/0139* (2013.01); *F17C 2270/0168* (2013.01); *H01M 2250/20* (2013.01); *Y02E 60/321* (2013.01); *Y02T 90/32* (2013.01)

(58) Field of Classification Search
USPC ........................................................... 702/99
See application file for complete search history.

(56) References Cited

U.S. PATENT DOCUMENTS

| | | | |
|---|---|---|---|
| 2007/0257043 | A1 | 11/2007 | Kanoya et al. |
| 2009/0150025 | A1* | 6/2009 | Akahoshi .............. F02D 41/042 701/36 |
| 2010/0167155 | A1* | 7/2010 | Kim ........................ F17C 5/06 429/462 |
| 2010/0198546 | A1* | 8/2010 | Kamata ................... H03B 5/04 702/99 |
| 2012/0298256 | A1 | 11/2012 | Mori |
| 2013/0014854 | A1* | 1/2013 | Mori ...................... F17C 5/007 141/1 |
| 2013/0244124 | A1* | 9/2013 | Wake ................... F02D 19/025 429/414 |

FOREIGN PATENT DOCUMENTS

| | | | | |
|---|---|---|---|---|
| JP | 4753696 | B2 | 6/2007 | |
| JP | 2007-303625 | A | 11/2007 | |
| JP | 2008-234969 | A | 10/2008 | |
| JP | 2010081757 | A * | 4/2010 | |
| JP | WO 2011089771 | A1 * | 7/2011 | ............. F17C 5/007 |
| JP | 2011-149533 | A | 8/2011 | |
| JP | 2011-157995 | A | 8/2011 | |
| JP | 2012-013508 | A | 1/2012 | |
| JP | 2012-077789 | A | 4/2012 | |
| WO | 2011/089771 | A1 | 7/2011 | |

* cited by examiner

FIG. 11
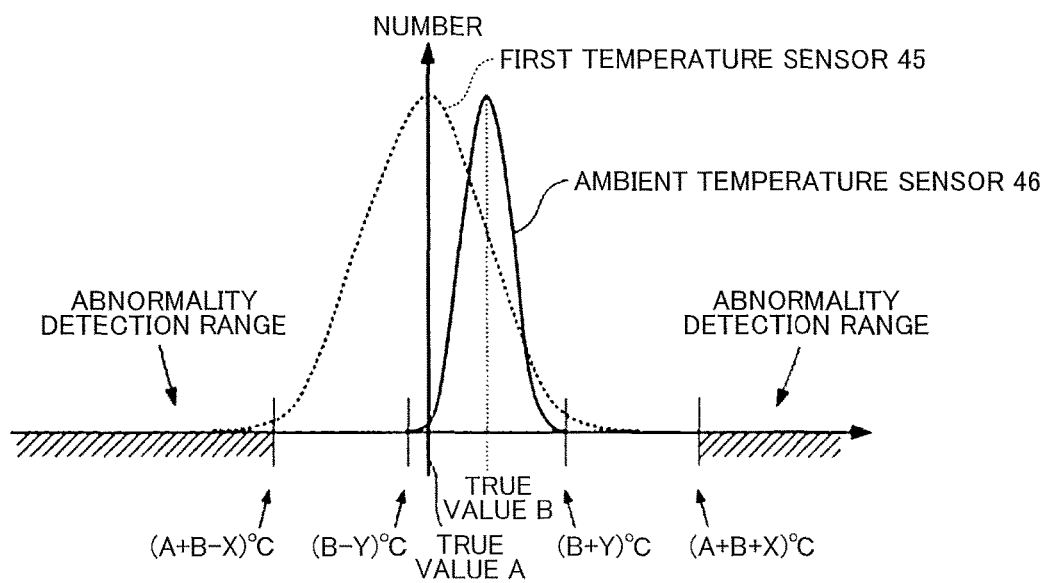

GAS FILLING SYSTEM AND VEHICLE

CROSS-REFERENCE TO RELATED APPLICATIONS

This is a national phase application based on the PCT International Patent Application No. PCT/JP2013/002844 filed Apr. 26, 2013, claiming priority to Japanese Patent Application No. 2012-101322 filed Apr. 26, 2012, the entire contents of both of which are incorporated herein by reference.

TECHNICAL FIELD

The invention relates to a gas filling system and a vehicle that charge gas from a gas station into an in-vehicle tank.

BACKGROUND ART

In recent years, a fuel-cell electric vehicle and a hydrogen gas vehicle have become a focus of attention. The fuel-cell vehicle generates electricity by electrochemically causing hydrogen to react with oxygen in air, and generates driving force by supplying the generated electricity to a motor. The hydrogen gas vehicle includes an internal combustion engine that burns hydrogen gas instead of gasoline.

These vehicles are equipped with a tank for storing hydrogen gas (see, for example, Patent Document 1). When the remaining amount of hydrogen gas in the tank is small, hydrogen gas is charged into the tank at a hydrogen station as a fuel gas station.

A temperature sensor and a pressure sensor are installed in the tank, and the amount of hydrogen gas filled in the tank is allowed to be acquired from an indicated value of the temperature sensor and an indicated value of the pressure sensor. With the temperature sensor, it is possible to perform temperature management so that the temperature in the tank does not exceed a limit value. The temperature in the tank increases as hydrogen gas is charged.

As for the above-described temperature management, there has been suggested that temperature information in a tank is sequentially transmitted from a vehicle side to a hydrogen station side and the hydrogen station automatically stops charging of hydrogen before the temperature of the tank exceeds its permissible temperature (see, for example, Patent Document 2).

However, if the temperature sensor in the tank has an abnormality due to a drift, or the like, the following problems arise because it is not possible to accurately measure the temperature in the tank.

Initially, the problem in the case where the temperature sensor indicates a temperature higher than an actual temperature in the tank as an indicated value will be described. For example, it is assumed that, when an environmental temperature (ambient temperature) is −40° C. and the actual temperature in the tank is also −40° C. as well as the environmental temperature, the indicated value of the temperature sensor is 85° C. (that is, there is a drift of +125° C. in the temperature sensor). The hydrogen station feeds hydrogen gas to the tank by adjusting the feeding rate (pressure) of hydrogen gas so that the indicated value of the temperature sensor does not increase to 85° C. or higher.

In this case, hydrogen gas is charged into the tank until a filling pressure that is assumed in the case where the temperature in the tank is 85° C.; however, the actual temperature in the tank is −40° C., with the result that overcharging occurs (the filling factor becomes higher than or equal to 100%). In addition, if the vehicle moves to a place of which the environmental temperature is, for example, 65° C. after completion of charging, there is a concern that the temperature in the tank steeply increases and exceeds a permissible pressure of the tank.

Secondly, the problem in the case where the temperature sensor indicates a temperature lower than the actual temperature in the tank as an indicated value will be described. In this case, there is a possibility that hydrogen gas is charged even when the temperature in the tank exceeds 85° C. If hydrogen gas continues to be charged into the tank in such an overheating state (the temperature in the tank is higher than or equal to 85° C.), there is a concern of occurrence of troubles, such as a decrease in the strength of the tank resulting from thermal degradation of a resin portion of the tank and emission of hydrogen gas to the outside of the vehicle resulting from activation of a relief valve.

That is, if hydrogen gas is charged based on the indicated value of the temperature sensor in a state where there is a drift in the temperature sensor in the tank, overcharging or overheating occurs, with the result that stress larger than that in ordinary use acts on the tank.

Therefore, there has been suggested a fuel gas filling system in which a temperature difference between a temperature in a tank and a temperature of hydrogen gas that is fed to the tank is calculated, it is determined that temperature information in the tank is abnormal when the temperature difference exceeds a predetermined threshold $T_{th}$, and a flow rate of hydrogen gas that is fed to the tank is reduced as compared to during normal times (see, for example, Patent Document 3).

RELATED ART DOCUMENT

Patent Document

Patent Document 1: Japanese Patent Application Publication No. 2007-16893 (JP 2007-16893 A)
Patent Document 2: Japanese Patent Application Publication No. 2011-157995 (JP 2011-157995 A)
Patent Document 3: Japanese Patent Application Publication No. 2011-149533 (JP 2011-149533 A)

SUMMARY OF THE INVENTION

Problem to be Solved by the Invention

However, the fuel gas filling system described in Patent Document 3 needs to carry out charging at a low flow rate for a predetermined time from the hydrogen station side into the tank before full-scale charging is started in order to detect whether there is a drift in the temperature sensor in the tank, so there has been a problem that it takes time and effort for detection of a drift.

The invention is contemplated in order to solve such an existing problem, and it is an object of the invention to provide a gas filling system and a vehicle that are able to simply detect, at a vehicle side, whether there is a drift in a temperature sensor that measures a temperature in a tank of the vehicle.

Means for Solving the Problem

In order to achieve the above object, a gas filling system according to the invention includes: a vehicle that includes single or multiple tanks and a first communication instrument, the single or multiple tanks being able to contain high-pressure gas; and a gas station that includes a second communication instrument that receives a signal that is transmitted from the first communication instrument, and that feeds the gas to the single or multiple tanks, wherein the vehicle includes a first temperature sensor that acquires temperature information of the gas stored in a body portion of the single tank; a second temperature sensor that acquires temperature information outside the body portion of the single tank; a calculation unit that calculates a difference between an indicated value of the first temperature sensor and an indicated value of the second temperature sensor; and a determination unit that determines whether the absolute value of the difference calculated by the calculation unit is larger than a predetermined value, and the determination unit permits transmission of the temperature information, acquired by the first temperature sensor, from the first communication instrument to the second communication instrument on the condition that the absolute value of the difference calculated by the calculation unit is smaller than or equal to the predetermined value, and prohibits transmission of the temperature information, acquired by the first temperature sensor, from the first communication instrument to the second communication instrument on the condition that the absolute value of the difference calculated by the calculation unit is larger than the predetermined value.

With this configuration, the gas filling system according to the invention is able to simply detect, at the vehicle side, whether there is a drift in the first temperature sensor that measures the temperature in the tank of the vehicle. The gas filling system according to the invention is able to prohibit charging of hydrogen gas based on the temperature information of the first temperature sensor when there is a drift in the first temperature sensor.

In the gas filling system according to the invention, preferably, the second temperature sensor is provided in a valve connected to one end of the body portion of the single tank.

With this configuration, the gas filling system according to the invention is able to avoid degradation of the reference sensor due to hydrogen gas at low cost because the second temperature sensor that serves as the reference sensor for the first temperature sensor is installed at a location at which the second temperature sensor is not exposed to hydrogen gas.

In the gas filling system according to the invention, preferably, the vehicle further includes an ambient temperature sensor for acquiring temperature information of an ambient temperature, and the second temperature sensor is the ambient temperature sensor.

With this configuration, the gas filling system according to the invention is able to reduce cost by using the ambient temperature sensor, which is an already-existing component of the vehicle, as the reference sensor.

In the gas filling system according to the invention, preferably, the vehicle further includes a drift amount estimation unit that estimates a drift amount of the first temperature sensor on the condition that it is determined by the determination unit that the absolute value of the difference is larger than the predetermined value; and a temperature information correction unit that corrects the temperature information of the first temperature sensor by using the drift amount estimated by the drift amount estimation unit, and the determination unit permits transmission of temperature information, corrected by the temperature information correction unit, from the first communication instrument to the second communication instrument on the condition that the absolute value of the difference calculated by the calculation unit is larger than the predetermined value.

With this configuration, the gas filling system according to the invention is able to carry out charging of hydrogen gas based on the corrected temperature information of the first temperature sensor while suppressing overcharging and overheating even when there is a drift in the first temperature sensor.

In order to achieve the above object, a gas filling system according to the invention includes: a vehicle that includes multiple tanks and a first communication instrument, the multiple tanks being able to contain high-pressure gas; and a gas station that includes a second communication instrument that receives a signal that is transmitted from the first communication instrument, and that feeds the gas to the multiple tanks, wherein the vehicle includes a first temperature sensor that acquires temperature information of the gas stored in a body portion of one tank among the multiple tanks; a second temperature sensor that acquires temperature information of the gas stored in a body portion of the tank other than the one tank; a calculation unit that calculates a difference between an indicated value of the first temperature sensor and an indicated value of the second temperature sensor; and a determination unit that determines whether the absolute value of the difference calculated by the calculation unit is larger than a predetermined value, and the determination unit permits transmission of the temperature information, acquired by the first temperature sensor, from the first communication instrument to the second communication instrument on the condition that the absolute value of the difference calculated by the calculation unit is smaller than or equal to the predetermined value, and prohibits transmission of the temperature information, acquired by the first temperature sensor, from the first communication instrument to the second communication instrument on the condition that the absolute value of the difference calculated by the calculation unit is larger than the predetermined value.

With this configuration, the gas filling system according to the invention is able to simplify the configuration of each tank because one temperature sensor just needs to be installed in each tank when the vehicle includes two or more tanks.

In the gas filling system according to the invention, preferably, the vehicle further includes a drift amount estimation unit that estimates a drift amount of the first temperature sensor on the condition that it is determined by the determination unit that the absolute value of the difference is larger than the predetermined value; and a temperature information correction unit that corrects the temperature information of the first temperature sensor by using the drift amount estimated by the drift amount estimation unit, and the determination unit permits transmission of temperature information, corrected by the temperature information correction unit, from the first communication instrument to the second communication instrument on the condition that the absolute value of the difference calculated by the calculation unit is larger than the predetermined value.

With this configuration, the gas filling system according to the invention is able to carry out charging of hydrogen gas based on the corrected temperature information of the first temperature sensor while suppressing overcharging and overheating even when there is a drift in the first temperature sensor.

In order to achieve the above object, a vehicle according to the invention includes: a first communication instrument; a single or multiple tanks that are able to contain high-pressure gas that is supplied from a gas station including a second communication instrument that receives a signal from the first communication instrument; a first temperature sensor that acquires temperature information of the gas stored in a body portion of the single tank; a second temperature sensor that acquires temperature information outside the body portion of the single tank; a calculation unit that calculates a difference between an indicated value of the first temperature sensor and an indicated value of the second temperature sensor; and a determination unit that determines whether the absolute value of the difference calculated by the calculation unit is larger than a predetermined value, and the determination unit permits transmission of the temperature information, acquired by the first temperature sensor, from the first communication instrument to the second communication instrument on the condition that the absolute value of the difference calculated by the calculation unit is smaller than or equal to the predetermined value, and prohibits transmission of the temperature information, acquired by the first temperature sensor, from the first communication instrument to the second communication instrument on the condition that the absolute value of the difference calculated by the calculation unit is larger than the predetermined value.

With this configuration, the gas filling system according to the invention is able to simply detect, at the vehicle side, whether there is a drift in the first temperature sensor that measures the temperature in the tank of the vehicle. The gas filling system according to the invention is able to prohibit charging of hydrogen gas based on the temperature information of the first temperature sensor when there is a drift in the first temperature sensor.

Effect of the Invention

According to the invention, it is possible to provide a gas filling system and a vehicle that are able to simply detect, at a vehicle side, whether there is a drift in a temperature sensor that measures a temperature in a tank of the vehicle and that are able to prohibit charging of hydrogen gas based on temperature information of the temperature sensor when there is a drift in the temperature sensor.

BRIEF DESCRIPTION OF THE DRAWINGS

FIG. 11 is a graph that shows the distribution of a drift amount of a first temperature sensor and the distribution of a drift amount of a second temperature sensor in the gas filling system according to the fourth embodiment.

MODES FOR CARRYING OUT THE INVENTION

Hereinafter, embodiments of a gas filling system and a vehicle according to the invention will be described with reference to the drawings.

First Embodiment

Figure 1:
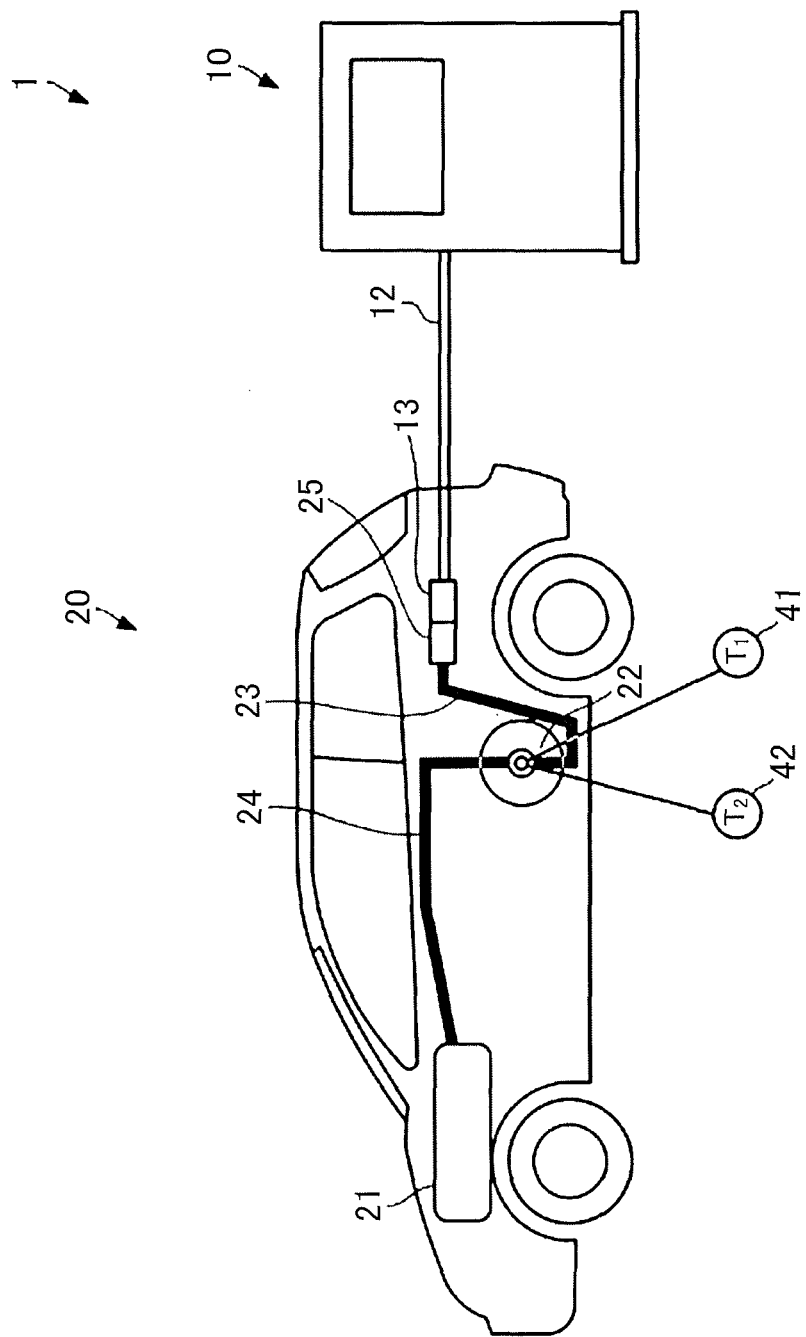
FIG. 1 is a schematic view of a gas filling system according to a first embodiment.

Initially, the configuration of a gas filling system according to a first embodiment will be described. As shown in FIG. 1, the gas filling system 1 according to the present embodiment includes a vehicle 20 and a gas station 10. The vehicle 20 travels by using hydrogen gas as fuel gas. The gas station 10 feeds hydrogen gas to the vehicle 20.

Figure 2:
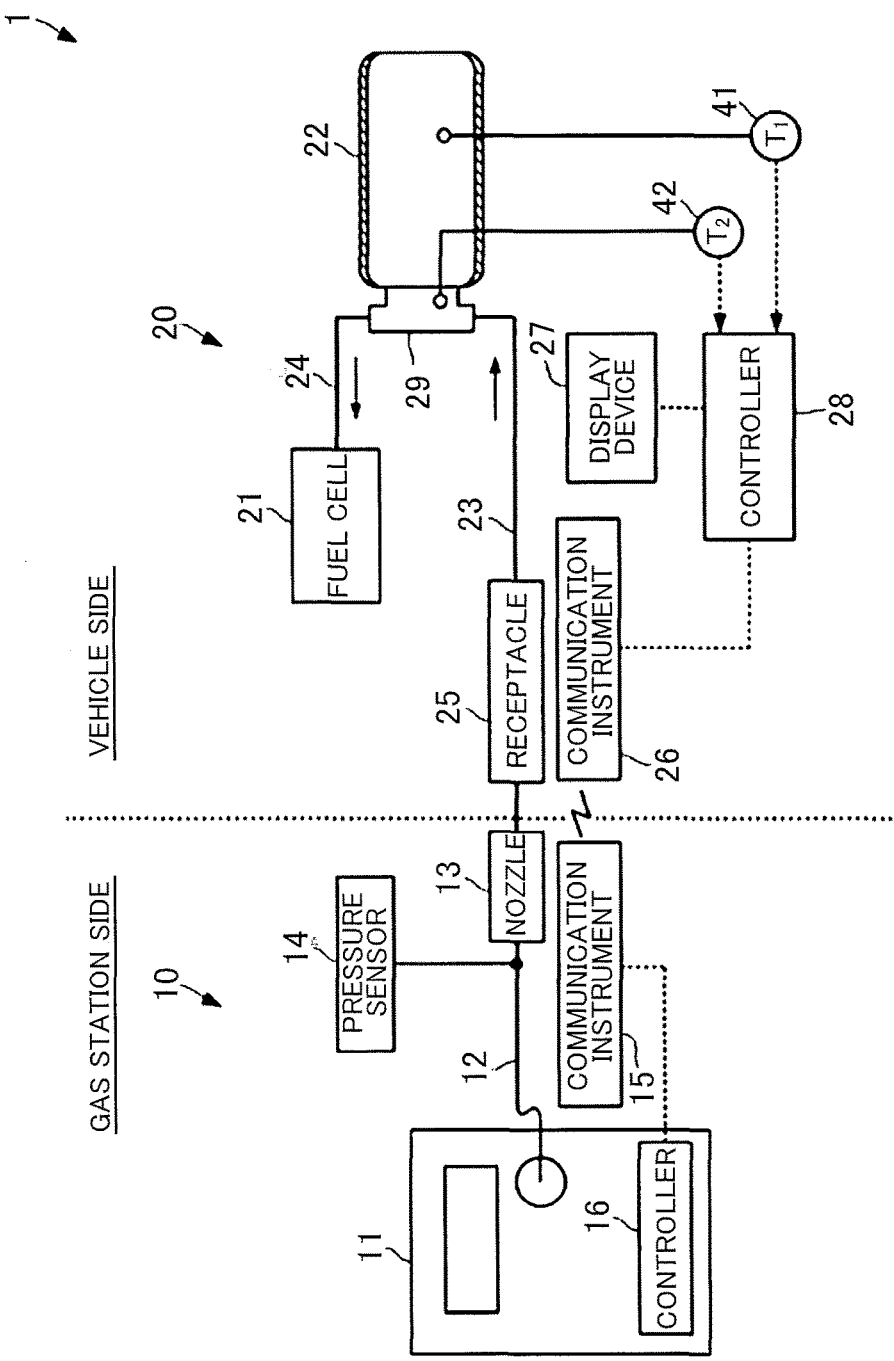
FIG. 2 is a configuration view of the gas filling system according to the first embodiment.

As shown in FIG. 2, the gas station 10 includes a dispenser 11, a charging hose 12, a nozzle 13, a pressure sensor 14, a communication instrument 15 and a controller 16. The dispenser 11 delivers hydrogen gas. The charging hose 12 is connected to the dispenser 11. The nozzle 13 is connected to an end of the Charging hose 12. The pressure sensor 14 is provided near the nozzle 13. The communication instrument 15 is provided at the distal end of the nozzle 13, and is used to transmit or receive various pieces of information to or from the vehicle 20.

The communication instrument 15 is an instrument by which the vehicle 20 communicates with the gas station 10, and functions as a receiver that receives signals including various pieces of information and a transmitter that transmits signals including various pieces of information. The communication instrument 15, for example, has a communication interface that carries out wireless communication, such as infrared-ray communication. Information received by the communication instrument 15 transmitted to the controller 16.

The controller 16 is configured as a microcomputer that includes a CPU, a ROM and a RAM inside. The controller 16 controls devices (not shown) in the gas station 10 on the basis of data of changes in pressure output from the pressure sensor 14 and information at the vehicle 20 side, received from the communication instrument 15. Thus, the controller 16 controls the flow rate or amount of hydrogen gas that is charged into the vehicle 20.

The vehicle 20 includes a fuel cell 21, a single tank 22, a passage (hereinafter, referred to as gas charging passage) 23, a passage (hereinafter, referred to as gas feeding passage) 24, a receptacle 25, a communication instrument 26, a display device 27 and a controller 28. The tank 22 is able to contain high-pressure hydrogen gas. The passage 23 is used to introduce hydrogen gas, fed from the gas station 10, to the tank 22. The passage 24 is used to feed hydrogen gas from the tank 22 to the fuel cell 21. The receptacle 25 is connected to an end of the gas charging passage 23. The communication instrument 26 is used to transmit various, pieces of information with the communication instrument 15 of the gas station 10. The display device 27 is used to display various pieces of information.

Valves (not shown), such as a check valve and an electromagnetic valve, are arranged as needed in the gas charging passage 23 and the gas feeding passage 24.

A valve assembly 29 is screw-connected to the tank 22. The valve assembly 29 is formed by integrally assembling various valves, sensors, and the like. Hydrogen gas is charged into or discharged from the tank 22 via the valve assembly 29.

The receptacle 25 is a portion to which the nozzle 13 is connected at the time of charging hydrogen, and is, for example, provided in a lid box of the vehicle 20.

The communication instrument 26 is provided near the receptacle 25. A communicable state is established between the communication instrument 15 and the communication instrument 26 in a state where the receptacle 25 and the nozzle 13 are connected to each other.

The communication instrument 26 is an instrument by which the vehicle 20 communicates with the gas station 10, and, for example, has a communication interface that carries out wireless communication, such as infrared-ray communication. The receptacle 25 incorporates a check valve (not shown), or the like, for preventing backflow of hydrogen gas toward the outside.

The controller 28 is configured as a microcomputer that includes a CPU, a ROM and a RAM inside, and controls the vehicle 20. The CPU executes a desired computation in accordance with a control program, and executes various processes or controls, such as open/close of the electromagnetic valve included in the vehicle 20. The ROM stores control programs and control data that are processed in the CPU. The RAM is mainly used as various work areas for control processes.

The controller 28 is connected to the communication instrument 26, first and second temperature sensors 41, 42 (described later) and the display device 27. The controller 28 transmits information that can be acquired at the vehicle 20 to the communication instrument 15 of the gas station 10 by using the communication instrument 26.

Figure 3:
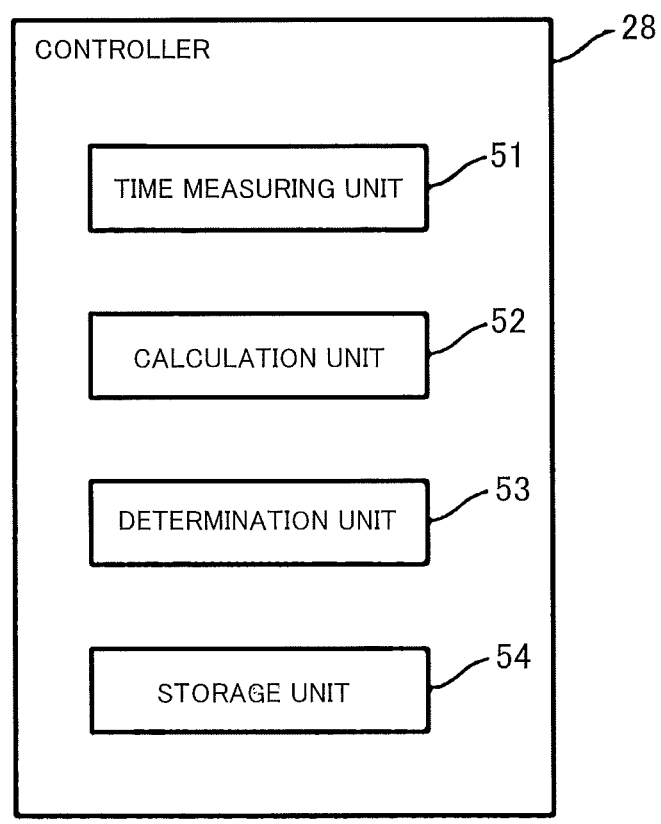
FIG. 3 is a functional block diagram of a controller for a vehicle in the gas filling system according to the first embodiment.

As shown in FIG. 3, the vehicle 20-side controller 28 includes a time measuring unit 51, a calculation unit 52, a determination unit 53 and a storage unit 54 as functional blocks for determining whether the first temperature sensor 41 has an abnormality.

The time measuring unit 51 measures an elapsed time from a stop of the vehicle 20. The calculation unit 52 calculates a difference (hereinafter, referred to as sensor temperature difference) between an indicated value of the first temperature sensor 41 and an indicated value of the second temperature sensor 42. The storage unit 54 is formed of the above-described ROM, RAM, and the like.

The determination unit 53 determines whether the absolute value of the sensor temperature difference calculated by the calculation unit 52 is larger than a predetermined value. As will be further described later, the determination unit 53 permits transmission of temperature information, acquired by the first temperature sensor 41, from the communication instrument 26 to the communication instrument 15 on the condition that the absolute value of the sensor temperature difference is smaller than or equal to the predetermined value, and prohibits transmission of the temperature information, acquired by the first temperature sensor 41, from the communication instrument 26 to the communication instrument 15 on the condition that the absolute value of the sensor temperature difference is larger than the predetermined value.

Next, the specific structure of the tank 22 and the arrangement of the valves will be described. The tank 22 can be manufactured from a metal material, such as steel. However, from the viewpoint of weight reduction, the tank 22 is desirably manufactured from a so-called fiber reinforced plastic (FRP) in which polyamide (PA) resin is reinforced with fiber.

The tank 22 has a so-called high-pressure chargeable structure. The tank 22 stores any gas, for example, hydrogen gas that is fuel gas in the vehicle 20 including a fuel cell as in the case of the present embodiment. The tank 22 is also able to charge various high-pressure-charging-preferred gases other than the hydrogen gas and liquefied gas fuel, such as liquefied petroleum gas (LPG) for an internal combustion engine, liquefied natural gas (LNG) and compressed natural gas (CNG).

Figure 4:
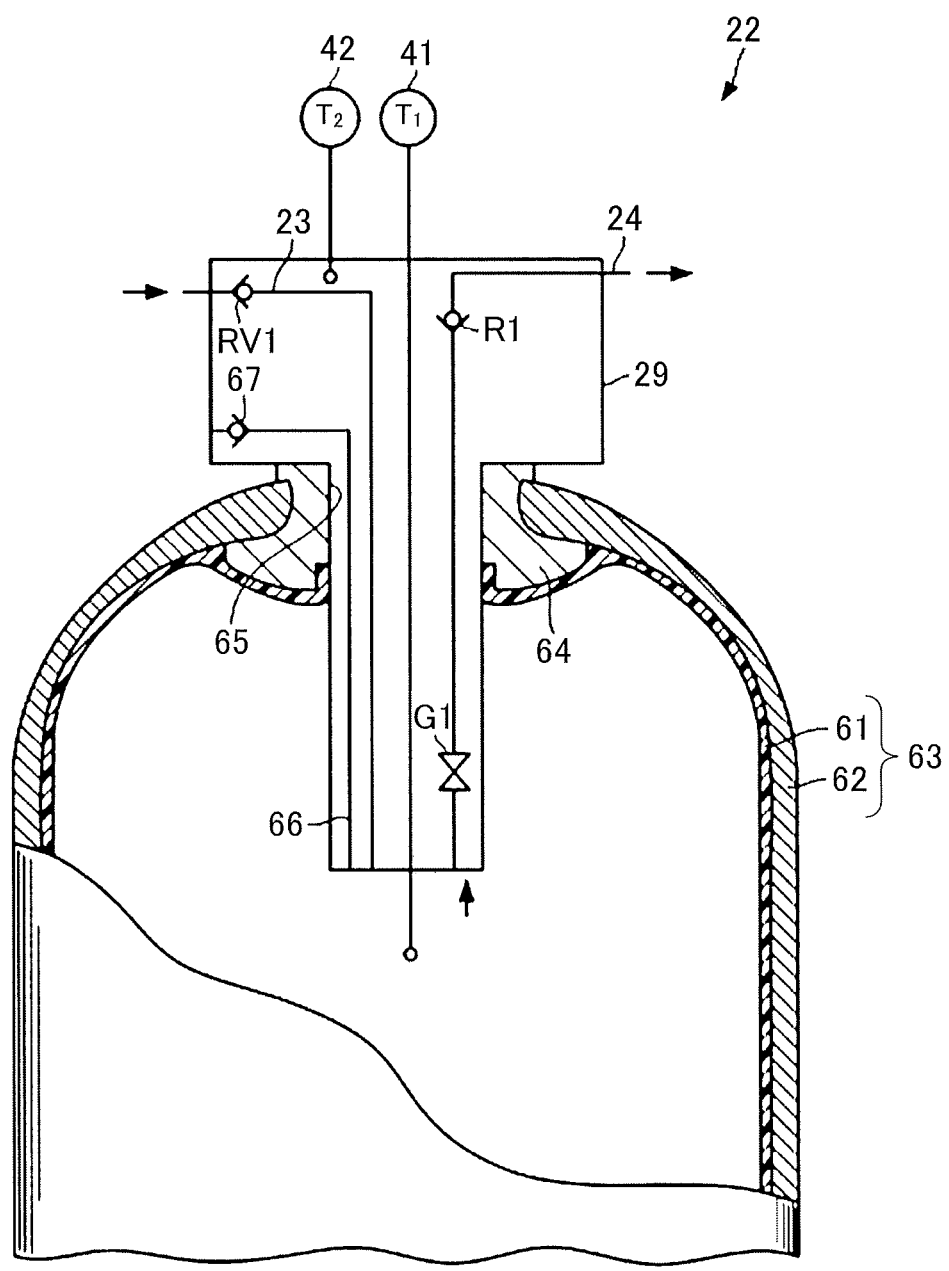
FIG. 4 is an enlarged view that shows the configuration of a tank near a valve assembly in the gas filling system according to the first embodiment.

As shown in FIG. 4, the tank 22 includes a body portion 63, an end fitting 64 and a valve assembly 29. The body portion 63 is formed of a liner 61 and a shell 62 on the outer side of the liner 61. The end fitting 64 is connected to one end of the body portion 63 in the longitudinal direction. The valve assembly 29 hermetically seals an opening of the end fitting 64. The body portion 63 is configured to be able to store hydrogen gas of, for example, 35 MPa or 70 MPa. An internal thread 65 is formed on the inner periphery of the opening of the end fitting 64. The valve assembly 29 is screw-connected to the internal thread 65.

The valve assembly 29 is provided so as to extend from the inside of the tank 22 to the outside of the tank 22. An external thread is formed on the outer periphery of a neck portion of the valve assembly 29. The external thread is screwed to the internal thread 65. In a state where the valve assembly 29 is screw-connected to the end fitting 64, any gap between the valve assembly 29 and the end fitting 64 is airtightly sealed by a plurality of seal members (not shown).

Part of the gas charging passage 23, part of the gas feeding passage 24 and the relief passage 66 are formed inside the valve assembly 29. A check valve RV1 is provided in the gas charging passage 23. An electromagnetic valve G1 is provided in the gas feeding passage 24. A relief valve 67 is provided in the relief passage 66. The relief valve 67 reduces the internal pressure of the tank 22 when the internal pressure has reached a predetermined value or higher. A location at which the electromagnetic valve G1 is provided may be outside of the valve assembly 29.

In addition, the tank 22 includes the first temperature sensor 41 and the second temperature sensor 42. The first temperature sensor 41 acquires temperature information of hydrogen gas stored in the body portion 63. The second temperature sensor 42 acquires temperature information outside the body portion 63. The first temperature sensor 41 is installed inside the body portion 63. The second temperature sensor 42 is installed at a location inside the valve assembly 29. At the location, the second temperature sensor 42 is not exposed to hydrogen gas.

Figure 5:
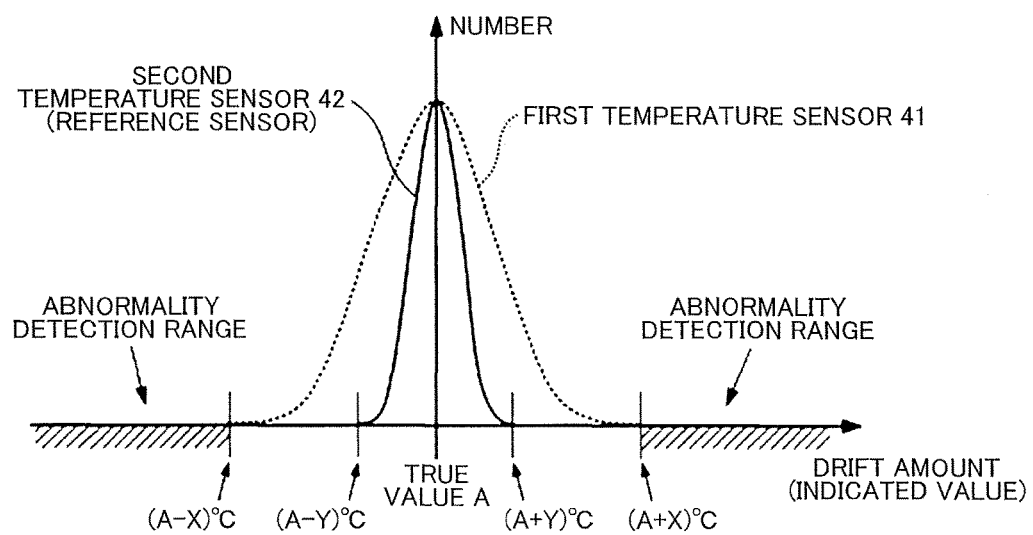
FIG. 5 is a graph that shows the distribution of a drift amount of a first temperature sensor and the distribution of a drift amount of a second temperature sensor in the gas filling system according to the first embodiment.

FIG. 5 is a graph that shows the distribution of a drift amount of the first temperature sensor 41 and the distribution of a drift amount of the second temperature sensor 42. The abscissa axis represents a drift amount of each temperature sensor. The ordinate axis represents the normalized number of temperature sensors that indicate a drift amount indicated on the abscissa axis on the assumption that there are a plurality of sensors of the same type as the first temperature sensor 41 or the second temperature sensor 42.

At the same time, the graph indicates a drift amount that is permitted for the first temperature sensor 41 as ±X, and indicates a drift amount that is permitted for the second temperature sensor 42 as ±Y. That is, where a true value of the temperature of hydrogen gas in the tank 22 is A, an permissible range of the indicated value of the first temperature sensor 41 ranges from (A−X) to (A+X).

The second temperature sensor 42 is used as a reference sensor for determining that the first temperature sensor 41 has an abnormality. A permissible value Y of the drift amount of the second temperature sensor 42 is desirably smaller than a permissible value X of the drift amount of the first temperature sensor 41.

Next, the operation of the gas filling system according to the present embodiment will be described.

Figure 6:
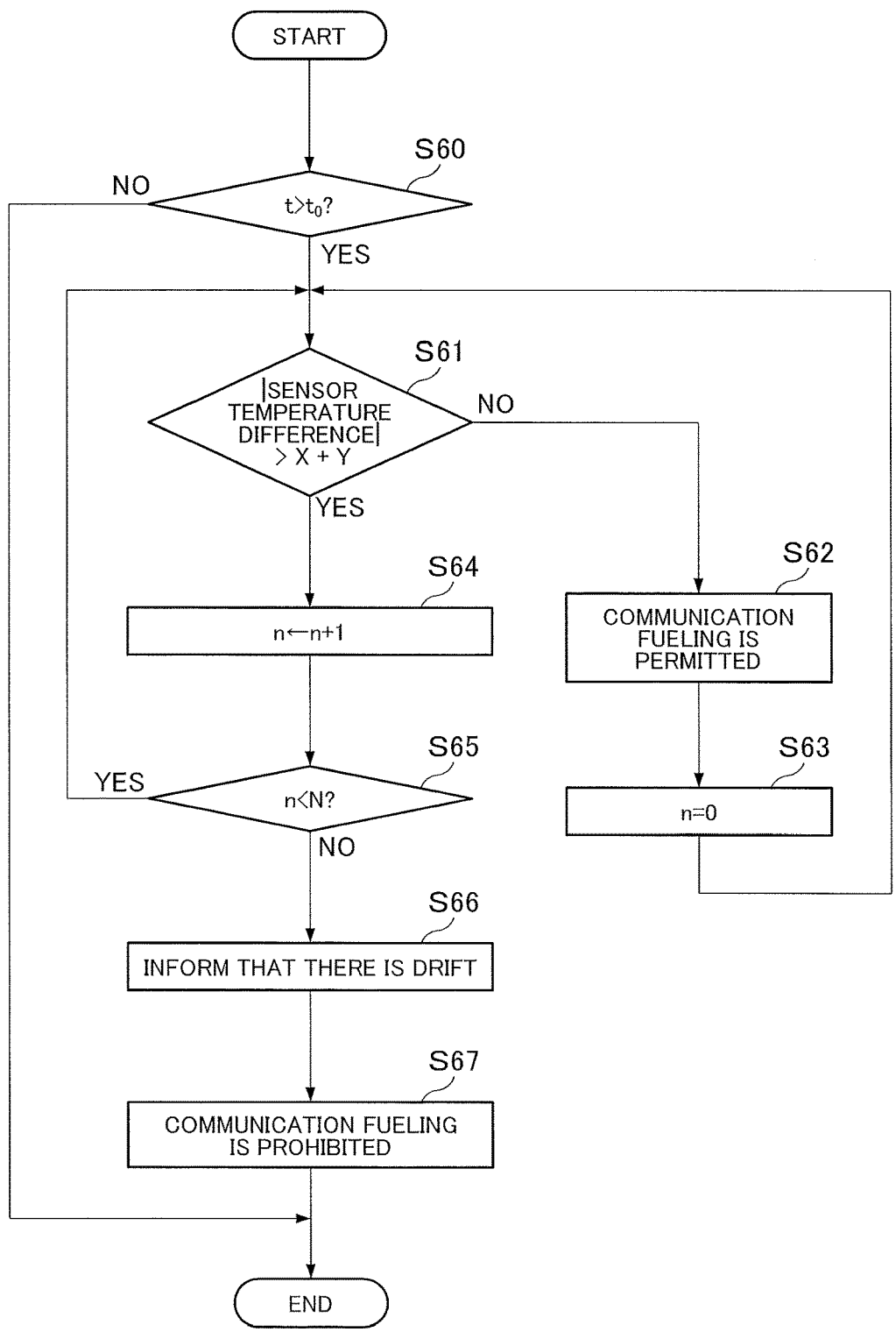
FIG. 6 is a flowchart that shows the procedure of a drift detection process that is executed by the controller for a vehicle in the gas filling system according to the first embodiment.

A drift detection process that is executed by the controller 28 of the vehicle 20 and that is shown in FIG. 6 is executed each time the vehicle 20 is started up.

In order to increase the accuracy of drift detection, it is desirable to bring the true value of the temperature to be measured by the first temperature sensor 41 and the true value of the temperature to be measured by the second temperature sensor 42 into coincidence with each other. However, during start-up of the vehicle 20, the temperature of hydrogen gas in the tank 22 changes as a result of flow of hydrogen gas out of the tank 22.

Therefore, immediately after a stop of the vehicle 20, the temperature of hydrogen gas in the tank 22 and the temperature of the inside of the valve assembly 29 generally do not coincide with each tithe. The inside of the valve assembly 29 is not exposed to hydrogen gas. Therefore, the temperature of hydrogen gas in the tank 22 and the temperature of the valve assembly 29 are sufficiently brought into coincidence with each other in a period of a predetermined time $t_0$ by utilizing heat conduction between the tank 22 and the valve assembly 29.

Therefore, the controller 28 determines whether an elapsed time t from an operation stop of the vehicle 20 to a start-up of the vehicle 20 exceeds the predetermined time $t_0$ (step S60). Here, the predetermined time $t_0$ is, for example, set to about six hours.

Subsequently, the controller 28 calculates the sensor temperature difference between the indicated value of the first temperature sensor 41 and the indicated value of the second temperature sensor 42, and determines whether the absolute value of the calculated sensor temperature difference is larger than a drift determination value (X+Y) (step S61).

The controller 28 determines that there is a possibility of a drift when the absolute value of the sensor temperature difference is larger than the drift determination value (X+Y); whereas the controller 28 determines that there is no drift when the absolute value of the sensor temperature difference is smaller than or equal to the drift determination value (X+Y).

When the absolute value of the sensor temperature difference is smaller than or equal to the drift determination value (X+Y), the controller 28 permits the gas station 10 to carry out communication fueling (described later). Specifically, in a state where the receptacle 25 is connected to the nozzle 13, the controller 28 permits transmission of the indicated value of the first temperature sensor 41 from the communication instrument 26 to the communication instrument 15 as temperature information (step S62).

The controller 28 sets the value of an index n indicating the number of times a drift has been detected to "0" (step S63), and then executes the process of step S61 again.

In the above-described step S62, when the temperature information is transmitted from the communication instrument 26 to the communication instrument 15, the vehicle 20-side controller 28 and the gas station 10-side controller 16 start the process of charging hydrogen gas (communication fueling) based on the specifications of "SAE-J2799" while carrying out communication via the communication instrument 26 and the communication instrument 15.

The controller 28 sequentially transmits information indicating the temperature of hydrogen gas in the tank 22 (temperature information) to the controller 16. When the controller 16 receives the temperature information, the controller 16 feeds hydrogen gas to the tank 22 by adjusting the feeding rate (pressure) of hydrogen gas so that the indicated value of the first temperature sensor 41 does not increase to 85° C. or higher. The controller 28 and the controller 16 communicate with each other in this way. Thus, it is possible to quickly charge hydrogen gas into the tank 22 while suppressing an increase in the temperature of hydrogen gas.

When it is determined in step S61 that the absolute value of the sensor temperature difference is larger than (X+Y), that is, when there is a possibility of a drift, the controller 28 increments the value of the index n (step S64). The value of the index n is initialized to "0" in advance before the process of step S60 is executed.

Subsequently, the controller 28 determines whether the number of times a drift has been successively detected exceeds a predetermined number of times N set in advance (step S65). The value of N is set to 1 or larger.

When the value of the index n is smaller than N, the controller 28 executes the process of step S61 again. When the value of the index n has reached N (that is, when the sensor temperature difference exceeds the drift determination value avg. (X+Y) N times successively, the controller 28 informs a driver of the vehicle 20 that there is a drift in the first temperature sensor 41 or repair, or the like, of the first temperature sensor 41 is prompted by causing the display device 27 to indicate those pieces of information (step S66).

The controller 28 prohibits the gas station 10 from carrying out communication fueling. Specifically, in a state where the receptacle 25 is connected to the nozzle 13, the controller 28 prohibits transmission of the temperature information of the first temperature sensor 41 from the communication instrument 26 to the communication instrument 15, and transmits instruction information for prohibiting communication fueling to the communication instrument 15 (step S67). Thus, only non-communication fueling based on, for example, the specifications of "SAE-J2601" is possible.

The above described processes of step S61 to step S65 are repeatedly executed until negative determination is made in step S65 or until the predetermined time set in advance elapses.

As described above, the gas filling system according to the present embodiment is able to simply detect, at the vehicle 20 side, whether there is a drift in the first temperature sensor 41 that measures the temperature in the tank 22 of the vehicle 20. When there is a drift in the first temperature sensor 41, it is possible to prohibit charging of hydrogen gas based on the temperature information of the first temperature sensor 41.

In addition, the gas filling system according to the present embodiment is able to issue an instruction whether to carry out communication fueling based on the indicated value of the first temperature sensor 41 in the tank 22 at the gas station 10 side, to employ a fueling mode other than the communication fueling or not before charging is started by the gas station 10.

In the gas filling system according to the present embodiment, the second temperature sensor (reference sensor) 42 is installed at a location equivalent to the temperature environment in the tank 22, so it is possible to accurately detect a drift of the first temperature sensor 41 in the tank 22. When the reference sensor is installed in the tank 22, a relatively expensive hydrogen-resistant temperature sensor is required. However, in the gas filling system according to the present embodiment, the reference sensor is installed at a location at which the reference sensor is not exposed to hydrogen gas, so it is possible to reduce cost.

In the gas filling system according to the present embodiment, the vehicle 20 includes the fuel cell 21 and the tank 22 that stores hydrogen gas to be fed to the fuel cell 21. However, the vehicle 20 may include an internal combustion engine that burns hydrogen gas or natural gas, instead of the fuel cell 21.

Second Embodiment

A second embodiment of the gas filling system according to the invention will be described with reference to the drawings. The gas filling system according to the second embodiment differs from the gas filling system according to the first embodiment in the configuration of the controller 28; however, the other components are similarly configured. Thus, the description of similar configuration and operations to those of the first embodiment is omitted where appropriate.

Figure 7:
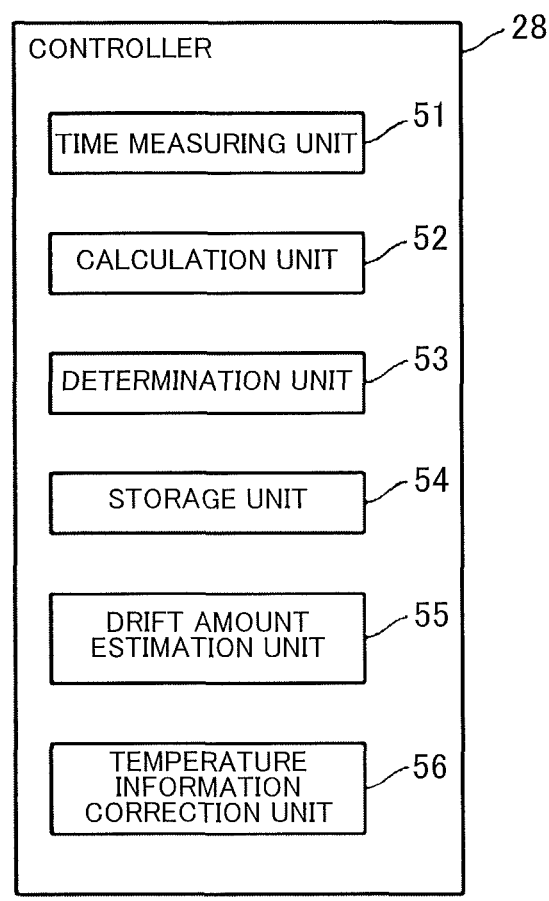
FIG. 7 is a functional block diagram of a controller for a vehicle in a gas filling system according to a second embodiment.

As shown in FIG. 7, the vehicle 20-side controller 28 includes a drift amount estimation unit 55 and a temperature information correction unit 56 in addition to the time measuring unit 51, the calculation unit 52, the determination unit 53 and the storage unit 54 as functional blocks for determining whether the first temperature sensor 41 has an abnormality.

The drift amount estimation unit 55 estimates a drift amount of the first temperature sensor 41 on the condition that it is determined by the determination unit 53 that the absolute value of the sensor temperature difference is larger than the drift determination value (X+Y). The temperature information correction unit 56 corrects the temperature information of the first temperature sensor 41 by using the drift amount estimated by the drift amount estimation unit 55.

Figure 8:
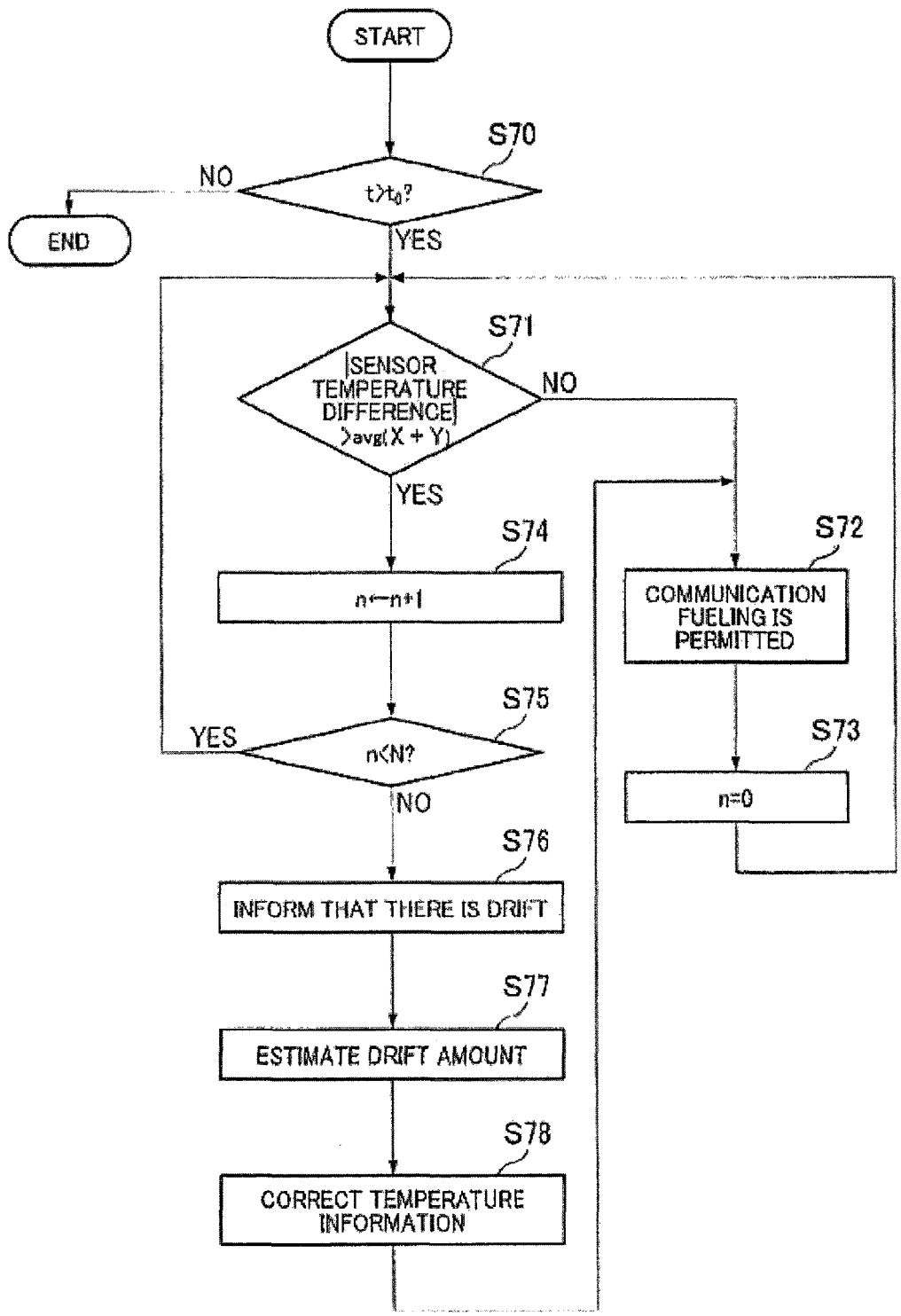
FIG. 8 is a flowchart that shows the procedure of a drift detection process that is executed by the controller for a vehicle in the gas filling system according to the second embodiment.

FIG. 8 is a flowchart that shows a drift detection process that is executed by the controller 28 of the vehicle 20 in the gas filling system according to the second embodiment. The processes of step S71, and step S73 to step S76 are respectively similar to the processes of step S61, and step S63 to step S66 in the flowchart shown in FIG. 6.

The controller 28 informs the driver of the vehicle 20 in step S76 that there is a drift in the first temperature sensor 41, and then estimates a drift of the first temperature sensor 41 (step S77). For example, the controller 28 calculates the average value of N sensor temperature differences as a drift amount of the first temperature sensor 41. The N sensor temperature differences exceed the drift determination value (X+Y) N times successively, and have been detected in step S75.

Subsequently, the controller 28 corrects the temperature information of the first temperature sensor 41 by subtracting the drift amount estimated in step S77 from the indicated value of the first temperature sensor 41 (step S78).

Subsequently, the controller 28 permits the gas station 10 to carry out communication fueling. Specifically, in a state where the receptacle 25 is connected to the nozzle 13, the controller 28 permits transmission of the corrected temperature information of the first temperature sensor 41 from the communication instrument 26 to the communication instrument 15 (step S72).

The process in the case from step S71 to step S72 is similar to the process of step S62 in the flowchart shown in FIG. 6. The above-described processes of step S71 to step S78 are repeatedly executed until the predetermined time set in advance elapses.

As described above, even when there is a drift in the first temperature sensor 41 in the tank 22, the gas filling system according to the present embodiment is able to charge hydrogen gas based on the corrected temperature information of the first temperature sensor 41 while suppressing overcharging and overheating.

Third Embodiment

A third embodiment of the gas filling system according to the invention will be described with reference to the drawings. Thus, the description of similar configuration and operations to those of the above-described embodiments is omitted where appropriate. A gas filling system 3 according to the present embodiment differs from the configurations of the first and second embodiments in that the vehicle includes two or more tanks and a temperature sensor of one of the tanks functions as a reference sensor for another one of the tanks. Hereinafter, the case where the vehicle includes two tanks will be described by way of example.

Figure 9:
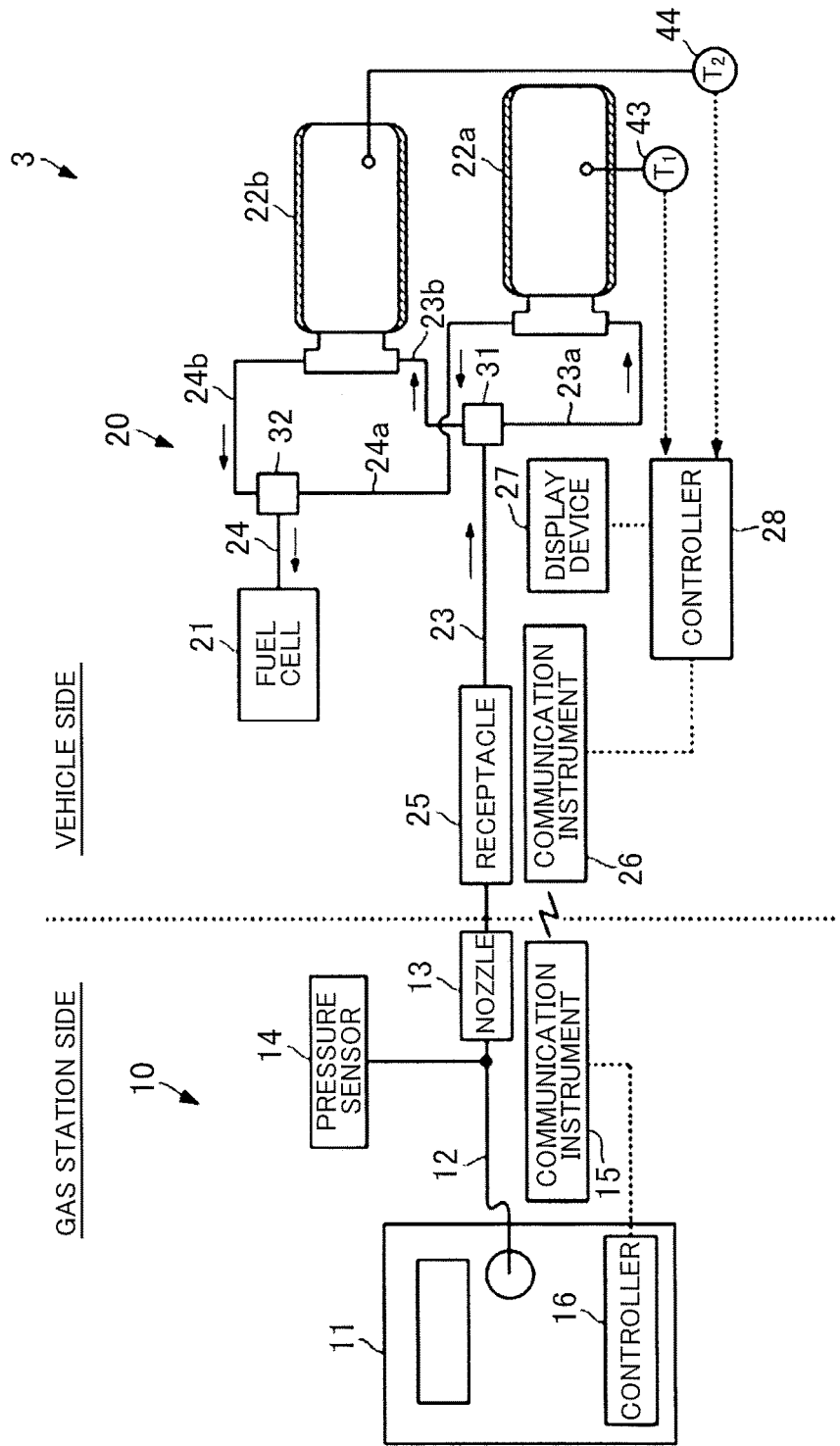
FIG. 9 is a configuration view of a gas filling system according to a third embodiment.

As shown in FIG. 9, in the gas filling system 3 according to the present embodiment, the vehicle 20 includes two tanks 22a, 22b, two branch passages 23a, 23b, and two branch passages 24a, 24b. The two tanks 22a, 22b are able to contain high-pressure hydrogen gas. The two branch passages 23a, 23b branch off from the gas charging passage 23 via an inlet-side manifold 31. The two branch passages 24a, 24b branch off from the gas feeding passage 24 via an outlet-side manifold 32. The configuration of passages in each of the tanks 22a, 22b is similar to that of the tank 22 shown in FIG. 4.

The inlet-side manifold 31 and the outlet-side manifold 32 are connected to the controller 28 (not shown), so the tank to which hydrogen gas is charged and the tank from which hydrogen gas is fed to the fuel cell are allowed to be selected.

A first temperature sensor 43 is installed inside the body portion 63 of the tank 22a. A second temperature sensor (reference sensor) 44 is installed inside the body portion 63 of the tank 22b. A drift amount that is permitted for the first temperature sensor 43 is ±X, and a drift amount that is permitted for the second temperature sensor 44 is ±Y. The temperature sensor installed inside the valve assembly 29 of the tank 22 may be omitted.

In the present embodiment, the calculation unit 52 of the controller 28 calculates the difference between an indicated value of the first temperature sensor 43 of the one tank 22a and an indicated value of the second temperature sensor 44 of the other tank 22b as a sensor temperature difference.

The determination unit 53 of the controller 28 permits transmission of temperature information, acquired by the first temperature sensor 43 of the one tank 22a, from the communication instrument 26 to the communication instrument 15 on the condition that the absolute value of the sensor temperature difference is smaller than or equal to the drift determination value (X+Y); whereas the determination unit 53 prohibits transmission of the temperature information, acquired by the first temperature sensor 43 of the one tank 22a, from the communication instrument 26 to the communication instrument 15 on the condition that the absolute value of the sensor temperature difference is larger than the drift determination value (X+Y).

That is, in the present embodiment, the second temperature sensor 44 is used as a reference sensor for determining whether the first temperature sensor 43 has an abnormality. Conversely, the first temperature sensor 43 may be used as a reference sensor for determining whether the second temperature sensor 44 has an abnormality. However, it is assumed that these two temperature sensors 43, 44 do not have a drift in a similar way.

The gas filling system 3 according to the present embodiment is able to detect a drift of the first temperature sensor 43 (or the second temperature sensor 44) as in the case of the first embodiment although the reference sensor is exposed to hydrogen gas. In the gas filling system 3 according to the present embodiment, a single temperature sensor just needs to be installed in each tank, so it is possible to simplify the configuration of each tank.

In the present embodiment, when a drift of any one of the temperature sensors has been detected, it is desirable to prohibit communication fueling for all the tanks.

Fourth Embodiment

A fourth embodiment of the gas filling system according to the invention will be described with reference to the drawings. Thus, the description of similar configuration and operations to those of the above-described embodiments is omitted where appropriate. The gas filling system 3 according to the present embodiment differs from the configurations of the first to third embodiments in that an ambient temperature sensor included in the vehicle is used as the reference sensor.

Figure 10:
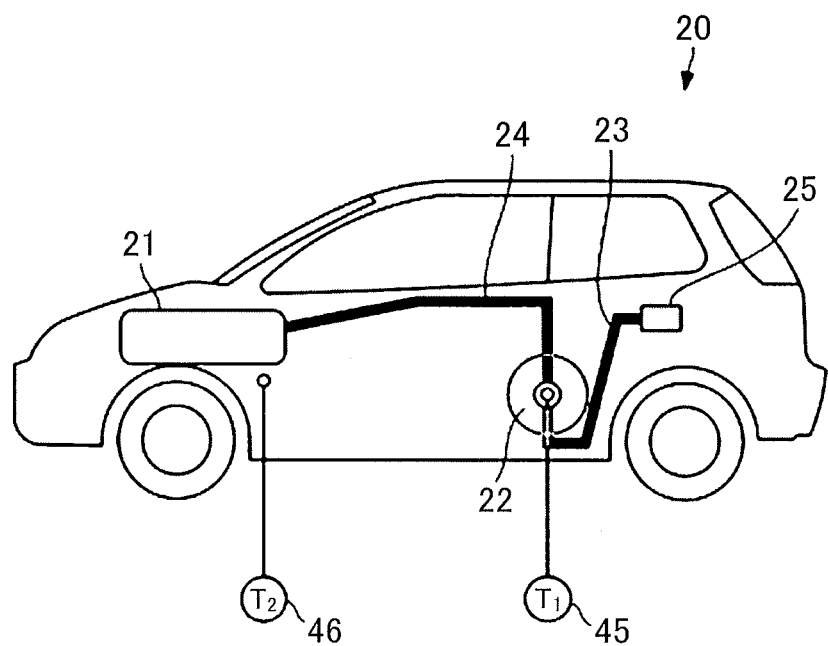
FIG. 10 is a schematic view of a gas filling system according to a fourth embodiment.

As shown in FIG. 10, in the gas filling system, the vehicle 20 includes an ambient temperature sensor 46 for acquiring temperature information of an ambient temperature as a second temperature sensor (reference sensor) in addition to a first temperature sensor 45 installed inside the body portion 63 of the tank 22 that is able to contain high-pressure hydrogen gas. The temperature sensor installed inside the valve assembly 29 of the tank 22 may be omitted.

In the present embodiment as well, the controller 28 determines that there is a possibility of a drift when the absolute value of the sensor temperature difference is larger than the drift determination value (X+Y); whereas the controller 28 determines that there is no drift when the absolute value of the sensor temperature difference is smaller than or equal to the drift determination value (X+Y).

Because the locations of the first temperature sensor 45 and ambient temperature sensor 46 are distanced from each other, there is a difference between true values A, B of respective measured values as shown in FIG. 11. Therefore, a permissible range of an indicated value of the first temperature sensor 45 shifts by the amount of the true value B in comparison with the first embodiment, and is from (A+B−X) to (A+B+X).

As described above, the gas filling system according to the present embodiment uses the ambient temperature sensor 46, which is an already-existing component of the vehicle 20, as the reference sensor, so it is possible to reduce cost.

INDUSTRIAL APPLICABILITY

The gas filling system and the vehicle according to the invention may be applied to those having a tank to which not only hydrogen gas but also other fuel gas, such as natural gas, is supplied. The gas filling system and the vehicle according to the invention may be applied to not only a vehicle but also a mobile unit equipped with a tank as a destination of charging gas, such as an airplane, a ship and a robot, from an outside.

DESCRIPTION OF REFERENCE NUMERALS

10 gas station, 11 dispenser, 12 charging hose, 13 nozzle, 14 pressure sensor, 15 second communication instrument, 16, 28 controller, 20 vehicle, 21 fuel cell, 22, 22a, 22b tank, 23 gas charging passage, 23a, 23b, 24a, 24b branch passage, 24 gas feeding passage, 25 receptacle, 26 first communication instrument, 27 display device, 29 valve, 31, 32 manifold, 41, 43, 45 first temperature sensor, 42, 44 second temperature sensor, 46 ambient temperature sensor, 51 time measuring unit, 52 calculation unit, 53 determination unit, 54 storage unit, 55 drift amount estimation unit, 56 temperature information correction unit, 61 liner, 62 shell, 63 body portion, 64 end fitting, 65 internal thread, 66 relief passage, 67 relief valve

The invention claimed is:

1. A gas filling system comprising:
a vehicle that includes a tank, a receptacle, and a first communication instrument, the tank being able to contain high-pressure gas and being constituted by single or multiple tanks; and
a gas station that includes a nozzle, a controller that is configured to control spray of the nozzle and a second communication instrument that receives a signal that is transmitted from the first communication instrument, and that feeds the gas to the tank, wherein
the vehicle includes
a first temperature sensor that acquires temperature information of the gas stored in a body portion of the tank;
a second temperature sensor that acquires temperature information outside the body portion of the tank; and
a controller that includes a CPU, a ROM, a RAM, and a determination unit, the controller is configured to:
calculate a difference between an indicated value of the first temperature sensor and an indicated value of the second temperature sensor;
determine whether the absolute value of the difference is larger than a predetermined value;
permit transmission of the temperature information, acquired by the first temperature sensor, from the first communication instrument to the second communication instrument on the condition that the absolute value of the difference is smaller than or equal to the predetermined value and the determination unit permits the gas station to carry out communication fueling,
wherein carrying out communication fueling means the controller in the vehicle and the controller in the station start the process of charging the high pressure gas to the tank through the nozzle and the receptacle while carrying communication via the communication instrument of the vehicle and the communication instrument in the station,
wherein the determination unit prohibits transmission of the temperature information, acquired by the first temperature sensor, from the first communication instrument to the second communication instrument on the condition that the absolute value of the difference between the indicated value of the first temperature sensor and the indicated value of the second temperature sensor is larger than the predetermined value, and wherein the second temperature sensor is provided at a position in a valve connected to one end of the body portion of the one of the tanks, where the second temperature sensor is outside a passage in the valve through which the gas flows.

2. The gas filling system according to claim 1, wherein the second temperature sensor is an ambient temperature sensor for acquiring temperature information of an ambient temperature.

3. The gas filling system according to claim 1, wherein the controller is further configured to
estimate a drift amount of the first temperature sensor on the condition that the absolute value of the difference is larger than the predetermined value;
correct the temperature information of the first temperature sensor by using the estimated drift amount; and
permit transmission of the corrected temperature information, from the first communication instrument to the second communication instrument even when the absolute value of the difference is larger than the predetermined value.

4. A gas filling system comprising:
a vehicle that includes a receptacle, multiple tanks and a first communication instrument, the multiple tanks being able to contain high-pressure gas and including a first tank and a second tank; and
a gas station that includes a nozzle, a controller that is configured to control spray of the nozzle and a second communication instrument that receives a signal that is transmitted from the first communication instrument, and that feeds the gas to the multiple tanks, wherein
the vehicle includes
a first temperature sensor that acquires temperature information of the gas stored in a body portion of the first tank;
a second temperature sensor that acquires temperature information of the gas stored in a body portion of the second tank; and
a controller that includes a CPU, a ROM, a RAM, and a determination unit, the controller is configured to:
calculate a difference between an indicated value of the first temperature sensor and an indicated value of the second temperature sensor;
determine whether the absolute value of the difference is larger than a predetermined value;
estimate a drift amount of the first temperature sensor on the condition that the absolute value of the difference is larger than the predetermined value;
correct the temperature information of the first temperature sensor by using the estimated drift amount;
permit transmission of the temperature information, acquired by the first temperature sensor, from the first communication instrument to the second communication instrument on the condition that the absolute value of the difference is smaller than or equal to the predetermined value and the determination unit permits the gas station to carry out communication fueling,
wherein carrying out communication fueling means the controller in the vehicle and the controller in the station start the process of charging the high pressure gas to the tank through the nozzle and the receptacle while carrying out communication via the communication instrument of the vehicle and the communication instrument in the station,
wherein the determination unit prohibits transmission of the temperature information, acquired by the first temperature sensor, from the first communication instrument to the second communication instrument on the condition that the absolute value of the difference is larger than the predetermined value, and
wherein the determination unit permits transmission of the corrected temperature information, from the first communication instrument to the second communication instrument even when the absolute value of the difference is larger than the predetermined value.

5. A vehicle comprising:
a first communication instrument;
a receptacle;
a tank that is able to contain high-pressure gas that is supplied from a gas station including a nozzle, a controller that is configured to control spray of the nozzle and a second communication instrument that receives a signal from the first communication instrument, the tank being constituted by single or multiple tanks;
a first temperature sensor that acquires temperature information of the gas stored in a body portion of the tank;
a second temperature sensor that acquires temperature information outside the body portion of the tank;
a controller that includes a CPU, a ROM, a RAM, and a determination unit, the controller is configured to:
calculate a difference between an indicated value of the first temperature sensor and an indicated value of the second temperature sensor;
determine whether the absolute value of the difference is larger than a predetermined value;
permit transmission of the temperature information, acquired by the first temperature sensor, from the first communication instrument to the second communication instrument on the condition that the absolute value of the difference is smaller than or equal to the predetermined value and the determination unit permits the gas station to carry out communication fueling, and
wherein carrying out communication fueling means the controller in the vehicle and the controller in the station start the process of charging the high pressure gas to the tank through the nozzle and the receptacle while carrying out communication via the communication instrument of the vehicle and the communication instrument in the station,
wherein the determination unit prohibits transmission of the temperature information, acquired by the first temperature sensor, from the first communication instrument to the second communication instrument on the condition that the absolute value of the difference is larger than the predetermined value, and
wherein the second temperature sensor is provided at a position in a valve connected to one end of the body portion of the one of the tanks, where the second temperature sensor is outside a passage in the valve through which the gas flows.

6. The gas filling system according to claim 1, wherein, prior to the temperature acquisition of the first temperature sensor and the second temperature sensor, an elapsed time from an operation stop of the vehicle to a start-up of the vehicle exceeds a predetermined time.

7. The gas filling system according to claim 4, wherein, prior to the temperature acquisition of the first temperature sensor and the second temperature sensor, an elapsed time from an operation stop of the vehicle to a start-up of the vehicle exceeds a predetermined time.

8. The vehicle according to claim 5, wherein, prior to the temperature acquisition of the first temperature sensor and the second temperature sensor, an elapsed time from an operation stop of the vehicle to a start-up of the vehicle exceeds a predetermined time.

9. The gas filling system according to claim 1, wherein the controller is further
configured to calculate the difference between the indicated value of the first temperature sensor and the indicated value of the second temperature sensor in a case where an elapsed time from an operation stop of the vehicle to a start-up of the vehicle exceeds a predetermined time.

10. The gas filling system according to claim 4, wherein the controller is further
configured to calculate the difference between the indicated value of the first temperature sensor and the indicated value of the second temperature sensor in a case where an elapsed time from an operation stop of the vehicle to a start-up of the vehicle exceeds a predetermined time.

11. The gas filling system according to claim 5, wherein the controller is further
configured to calculate the difference between the indicated value of the first temperature sensor and the indicated value of the second temperature sensor in a case where an elapsed time from an operation stop of the vehicle to a start-up of the vehicle exceeds a predetermined time.

* * * * *